(12) United States Patent
Matsumura et al.

(10) Patent No.: US 9,765,195 B2
(45) Date of Patent: *Sep. 19, 2017

(54) MOLDING RESIN COMPOSITION INCLUDING CHLORINATED VINYL CHLORIDE-BASED RESIN, AND MOLDED ARTICLE THEREOF

(71) Applicants: SEKISUI CHEMICAL CO., LTD., Osaka (JP); TOKUYAMA SEKISUI CO., LTD., Osaka (JP)

(72) Inventors: Kenichi Matsumura, Yamaguchi (JP); Atsushi Seiki, Yamaguchi (JP); Ryota Yamasugi, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,690

(22) Filed: Oct. 13, 2016

(65) Prior Publication Data

US 2017/0029594 A1 Feb. 2, 2017

Related U.S. Application Data

(63) Continuation of application No. 14/913,053, filed as application No. PCT/JP2014/075691 on Sep. 26, 2014.

(30) Foreign Application Priority Data

Sep. 27, 2013 (JP) ................................. 2013-202385

(51) Int. Cl.
C08K 3/22 (2006.01)
C08K 3/26 (2006.01)
C08K 5/053 (2006.01)
C08K 5/098 (2006.01)
C08K 5/103 (2006.01)

(52) U.S. Cl.
CPC ................. C08K 3/22 (2013.01); C08K 3/26 (2013.01); C08K 5/053 (2013.01); C08K 5/098 (2013.01); C08K 5/103 (2013.01); C08K 2003/2206 (2013.01); C08K 2003/2217 (2013.01); C08K 2003/2224 (2013.01)

(58) Field of Classification Search
CPC ........... C08L 27/24; C08K 3/22; C08K 5/053; C08K 5/098; C08K 5/103; C08K 3/26; C08K 2003/2206; C08K 2003/2217; C08K 2003/2224
USPC ....................................................... 524/310
See application file for complete search history.

(56) References Cited

U.S. PATENT DOCUMENTS 5,466,740 A * 11/1995 Miyata .................... C08K 5/098
423/594.14
2010/0063247 A1 3/2010 Sanni et al.

FOREIGN PATENT DOCUMENTS

| CN | 1271744 | 11/2000 |
|---|---|---|
| CN | 1536015 | 10/2004 |
| JP | 62-022842 | 1/1987 |
| JP | 06-072709 | 3/1994 |
| JP | 06-316662 | 11/1994 |
| JP | 11-193336 | 7/1999 |
| JP | 11193336 A * | 7/1999 |
| JP | 2004-238516 | 8/2004 |
| JP | 2006-328166 | 12/2006 |
| JP | 2006328166 A * | 12/2006 |
| JP | 2008-214466 | 9/2008 |
| JP | 2011-084619 | 4/2011 |
| JP | 2011-219546 | 11/2011 |
| WO | 2008/062526 | 5/2008 |

OTHER PUBLICATIONS

JP2006-328166A—machine translation.*
JPH11-193336A—machine translation.*
International Search Report dated Dec. 16, 2014 in corresponding International Application No. PCT/JP2014/075691.
Extended European Search Report dated Mar. 29, 2017 in corresponding European Application No. 14849241.6.
Extended European Search Report dated Mar. 29, 2017 in European Application No. 14848211.0.

* cited by examiner

Primary Examiner — Bijan Ahvazi
Assistant Examiner — Ronald Grinsted
(74) Attorney, Agent, or Firm — Wenderoth, Lind & Ponack, L.L.P.

(57) ABSTRACT

The present invention aims to provide a chlorinated vinyl chloride-based resin composition with excellent thermal stability and a molded body thereof. The present invention relates to a resin composition for molding, including a chlorinated vinyl chloride-based resin, a thermal stabilizer, and a polyalcohol and/or a partial ester of a polyalcohol. The chlorinated vinyl chloride-based resin has a chlorine content of 65% by weight or more and less than 72% by weight. The chlorinated vinyl chloride-based resin has, based on the total number of moles of a structural unit (a) —$CCl_2$—, a structural unit (b) —CHCl—, and a structural unit (c) —$CH_2$—, a proportion of the structural unit (a) of 17.5 mol % or less, a proportion of the structural unit (b) of 46.0 mol % or more, and a proportion of the structural unit (c) of 37.0 mol % or less. The thermal stabilizer contains at least one of a compound represented by the formula $Ca_{1-x}Mg_x(OH)_2$ where x satisfies the inequality $0<x<1$ and a compound represented by the formula $Ca_{1-y}Mg_yO$ where y satisfies the inequality $0<y<1$.

11 Claims, No Drawings

MOLDING RESIN COMPOSITION INCLUDING CHLORINATED VINYL CHLORIDE-BASED RESIN, AND MOLDED ARTICLE THEREOF

TECHNICAL FIELD

The present invention relates to a resin composition for molding containing a chlorinated vinyl chloride-based resin, and a molded body thereof.

BACKGROUND ART

Vinyl chloride-based resin compositions have been widely used as a material of resin molded bodies, such as building materials. Vinyl chloride-based resin compositions are required to have high thermal stability for processing at high temperatures. They need high thermal stability also in order to provide a molded body having thermal stability. Vinyl chloride-based resin compositions also need coloring resistance because color is important for resin molded bodies used as building materials. In order to improve such properties as thermal stability and coloring resistance, vinyl chloride-based resins are usually mixed with a thermal stabilizer before melt molding.

Conventionally used thermal stabilizers contain a heavy metal such as lead, cadmium, or tin. As concerns have arisen about the toxicity or the adverse effects on the environment of heavy metals, thermal stabilizers or resin molded products free of highly toxic heavy metals, such as lead, have been proposed. For example, Patent Literature 1 discloses a stabilized halogen-containing resin composition that contains a halogen-containing resin and a composite of acid clay and/or activated clay with a calcium hydroxide compound represented such as Mg, Zn, or Cu; and x and y are respectively within the ranges of $0 \leq x < 0.4$ and $0 \leq y < 0.1$).

However, even if a chlorinated vinyl chloride resin is contained with a mixture of acid clay and/or activated clay with a calcium hydroxide compound, the stability is insufficient.

CITATION LIST

Patent Literature

Patent Literature 1: JP 2008-214466 A

SUMMARY OF INVENTION

Technical Problem

The present invention aims to provide a resin composition for molding which contains a chlorinated vinyl chloride-based resin and has excellent thermal stability, and to provide a molded body thereof.

Solution to Problem

The present invention provides a resin composition for molding, including a chlorinated vinyl chloride-based resin, a thermal stabilizer, and a polyalcohol and/or a partial ester of a polyalcohol, the chlorinated vinyl chloride-based resin having a chlorine content of 65% by weight or more and less than 72% by weight, the chlorinated vinyl chloride-based resin having, based on the total number of moles of a structural unit (a) —$CCl_2$—, a structural unit (b) —CHCl—, and a structural unit (c) —$CH_2$—, a proportion of the structural unit (a) of 17.5 mol % or less, a proportion of the structural unit (b) of 46.0 mol % or more, and a proportion of the structural unit (c) of 37.0 mol % or less, the thermal stabilizer containing at least one of a compound represented by the formula $Ca_{1-x}Mg_x(OH)_2$ where x by the formula $Ca_{1-y}Mg_yO$ where y satisfies the inequality $0<y<1$; and a molded body of the resin composition.

Advantageous Effects of Invention

The present invention provides a resin composition for molding which contains a chlorinated vinyl chloride-based resin and has excellent thermal stability, and a molded body thereof.

The present invention provides a resin composition for molding which has a suitable tensile strength, a suitable tensile modulus, a suitable thermal deformation temperature, and excellent mechanical properties, and a molded body thereof.

DESCRIPTION OF EMBODIMENTS

The resin composition for molding contains a chlorinated vinyl chloride-based resin (hereinafter, referred to as "CPVC"), a thermal stabilizer, and a polyalcohol and/or a partial ester of a polyalcohol.

The CPVC has a chlorine content of 65% by weight or more and less than 72% by weight. If the chlorine content is 65% by weight or more, the CPVC can have a practically effective heat resistance. If the chlorine content is less than 72% by weight, a practically appropriate productivity of a chlorination reaction can be ensured, and the moldability of the resin composition for molding containing the CPVC can be sufficient.

The CPVC is obtained by chlorination of a vinyl chloride-based resin (PVC). The CPVC is a highly chlorinated resin with a chlorine content of about 65% by weight or more and less than 72% by weight. The chlorine content of the CPVC can be measured in accordance with JIS K 7229.

The CPVC contains a structural unit (a) —$CCl_2$—, a structural unit (b) —CHCl—, and a structural unit (c) —$CH_2$—.

The proportion of the structural unit (a) is 17.5 mol % or less based on the total number of moles of the structural units (a), (b), and (c). The proportion of the structural unit (a) is preferably 2.0 mol % or more and 16.0 mol % or less.

The proportion of the structural unit (b) is 46.0 mol % or more based on the total number of moles of the structural units (a), (b), and (c). The proportion of the structural unit (b) is preferably 53.5 mol % or more, more preferably 58.0 mol % or more and 70.0 mol % or less.

The proportion of the structural unit (c) is 37.0 mol % or less based on the total number of moles of the structural units (a), (b), and (c). The proportion of the structural unit (c) is preferably 35.8 mol % or less, more preferably 1.0 mol % or more and 30.5 mol % or less.

Such a CPVC can have high thermal stability as well as good moldability.

The mole ratio of the structural units (a), (b) and (c) in the molecular structure of the CPVC reflects the sites to which chlorine is introduced in chlorination of a PVC. Ideally, a PVC before chlorination contains about 0 mol % of the structural unit (a), about 50.0 mol % of the structural unit (b), and about 50.0 mol % of the structural unit (c). Chlorination reduces the proportion of the structural unit (c) and increases the proportions of the structural unit (b) and the structural unit (a). If the proportion of unstable structural units (a) with large steric hindrance excessively increases, or if chlorinated sites and non-chlorinated sites are unevenly distributed in the same CPVC particle, the non-uniformity of the state of chlorination increases. The increase in the non-uniformity significantly impairs the thermal stability of the CPVC. The CPVC with a proportion of the structural unit (a) of 17.5 mol % or less, a proportion of the structural unit (b) of 46.0 mol % or more, and a proportion of the structural unit (c) of 37.0 mol % or less has high uniformity and exhibits good thermal stability.

The mole ratio of the structural units (a), (b), and (c) in the molecular structure of the CPVC can be measured by analyzing the molecular structure by NMR. The NMR analysis can be performed in accordance with the method described in R. A. Komoroski, R. G. Parker, J. P. Shocker, Macromolecules, 1985, 18, 1257-1265.

The PVC may be a vinyl chloride homopolymer, a copolymer of a vinyl chloride monomer and a monomer having an unsaturated bond copolymerizable with a vinyl chloride monomer, or a graft copolymer containing a polymer graft-copolymerized with a vinyl chloride monomer. These polymers may be used alone, or in combination of two or more thereof.

Examples of the monomer having an unsaturated bond copolymerizable with a vinyl chloride monomer include α-olefins such as ethylene, propylene, and butylene; vinyl esters such as vinyl acetate and vinyl propionate; vinyl ethers such as butyl vinyl ether and cetyl vinyl ether; (meth)acrylates such as methyl (meth)acrylate, ethyl (meth) acrylate, butyl acrylate, and phenyl methacrylate; aromatic vinyls such as styrene and α-methylstyrene; vinyl halides such as vinylidene chloride and vinylidene fluoride; N-substituted maleimides such as N-phenyl maleimide and N-cyclohexyl maleimide. One or two or more thereof may be used.

The polymer to be graft-copolymerized with vinyl chloride may be any polymer that can be graft-copolymerized with vinyl chloride. Examples thereof include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, ethylene-propylene copolymers, acrylonitrile-butadiene copolymers, polyurethane, chlorinated polyethylene, and chlorinated polypropylene. These may be used alone, or in combination of two or more thereof.

The PVC may have any average degree of polymerization. The average degree of polymerization is preferably within the usual range of 400 to 3000. The average degree of polymerization is more preferably 600 to 1500. The average degree of polymerization can be measured in accordance with JIS K 6720-2:1999.

The PVC can be polymerized by any method. A conventionally known method may be used, such as aqueous suspension polymerization, bulk polymerization, solution polymerization, or emulsion polymerization.

In the CPVC molecular structure, a PVC portion which is not chlorinated is represented as —$CH_2$—CHCl—. This portion herein is referred to as "VC unit". In the CPVC used in the present invention, the amount of a sequence of four or more VC units in the molecular structure is preferably 30.0 mol % or less. As used herein, the term "sequence of four or more VC units" means a portion consisting of four or more VC units joined in series.

The VC units present in the CPVC can be a starting point of dehydrochlorination. VC units joined in series tend to cause a series of dehydrochlorination reactions called "zipper reaction". The greater the amount of the sequence of four or more VC units is, the more likely dehydrochlorination is to occur and the lower the thermal stability of the CPVC is. The amount of the sequence of four or more VC units is preferably 30.0 mol % or less, more preferably 28.0 mol % or less, still more preferably 18.0 mol % or less, particularly preferably 16.0 mol % or less.

The amount of the sequence of four or more VC units in the molecular structure can be measured by the above-mentioned molecular structure analysis by NMR.

If the CPVC used in the present invention has a chlorine content of 65% by weight or more and less than 69% by weight, the CPVC preferably has a UV absorbance at 216 nm of 0.8 or less.

If the CPVC has a chlorine content of 69% by weight or more and less than 72% by weight, the CPVC preferably has a UV absorbance at 216 nm of 8.0 or less. In an ultraviolet absorption spectrum, the wavelength of 216 nm is the wavelength at which —CH=CH—C(=O)— and —CH=CH—CH=CH—, heterologous structures in the CPVC, show absorption.

The heterologous structures in the molecular chain after a chlorination reaction can be quantified from the UV absorbance of the CPVC and thus used as an index of the thermal stability. In the molecular structure of the CPVC, a chlorine atom attached to carbon next to a doubly bonded carbon is unstable. This chlorine atom acts as a starting point of dehydrochlorination. Accordingly, the greater the UV absorbance at 216 nm is, the more likely dehydrochlorination is to occur and the lower the thermal stability is. If the CPVC has a chlorine content of 65% by weight or more and less than 69% by weight and a UV absorbance of more than 0.8, the heterologous structures in the molecular chain have a large influence, reducing the thermal stability. If the CPVC has a chlorine content of 69% by weight or more and less than 72% by weight and a UV absorbance of more than 8.0, the heterologous structures in the molecular chain have a large influence, reducing the thermal stability.

If the CPVC used in the present invention has a chlorine content of 65% by weight or more and less than 69% by weight, the time required for the amount of dehydrochlorination from the CPVC at 190° C. to reach 7000 ppm is preferably 60 seconds or longer. If the CPVC has a chlorine content of 69% by weight or more and less than 72% by weight, the time is preferably 100 seconds or longer.

CPVCs thermally decompose at high temperatures, generating HCl gas. Generally, as the degree of chlorination of a CPVC increases, the amount of VC units decreases and thus the amount of dehydrochlorination tends to decrease. However, as the degree of chlorination increases, non-uniform chlorination and the amount of heterologous structures increase, reducing the thermal stability. Measurement of the amount of dehydrochlorination thus enables analysis of the non-uniform chlorination and an increase in the amount of heterologous structures. For example, the time required for the amount of dehydrochlorination from the CPVC at 190° C. to reach 7000 ppm can be used as an index of the thermal stability. The shorter the time is, the lower the thermal stability is.

If the chlorine content is 65% by weight or more and less than 69% by weight and the time is shorter than 60 seconds, the thermal stability is significantly impaired. Thus, if the chlorine content is 65% by weight or more and less than 69% by weight, the time is preferably 60 seconds or longer, more preferably 70 seconds or longer, particularly preferably 80 seconds or longer. If the chlorine content is 69% by weight or more and less than 72% by weight and the time is shorter than 100 seconds, the thermal stability is significantly low. If the chlorine content is 69% by weight or more and less than 72% by weight, the time is preferably 100 seconds or longer, more preferably 120 seconds or longer, particularly preferably 140 seconds or longer.

The time it takes for the amount of dehydrochlorination at 190° C. to reach 7000 ppm can be measured as follows. One gram of the chlorinated vinyl chloride resin is put in a test tube. The resin is heated at 190° C. using an oil bath, and the generated HCl gas is recovered. The HCl gas thus recovered is dissolved in 100 mL of ion-exchanged water, followed by measuring the pH. The HCl concentration (ppm) (i.e., how many grams of HCl are generated per 1,000,000 g of the chlorinated vinyl chloride resin) is calculated based on the pH. The time it takes for the HCl concentration to reach 7000 ppm is measured.

The resin composition for molding of the present invention contains a polyalcohol and/or a partial ester of a polyalcohol.

Examples of the polyalcohol include mannitol, xylitol, sorbitol, trimethylolpropane, pentaerythritol, dipentaerythritol, tripentaerythritol, and glycerol.

The partial ester of a polyalcohol refers to an ester in which at least one of the hydroxyl groups in the polyalcohol is not esterified and remains as a hydroxyl group. The use of a partial ester of a polyalcohol can improve dispersibility in CPVC. The partial ester of a polyalcohol can be obtained by reacting at least one of the above polyalcohols with at least one mono- or polycarboxylic acid.

Whether an ester is a partial ester of a polyalcohol can be confirmed by measuring the hydroxy value of the molecule in accordance with JIS K 0070(1992), for example.

Examples of the mono- or polycarboxylic acid constituting the partial ester of a polyalcohol include monocarboxylic acids such as acetic acid, propionic acid, butyric acid, valeric acid, caproic acid, enanthic acid, caprylic acid, neodecanoic acid, 2-ethylhexanoic acid, pelargonic acid, capric acid, undecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-t-butylbenzoic acid, dimethylhydroxybenzoic acid, 3,5-di-tert-butyl-4-hydroxybenzoic acid, toluic acid, dimethylbenzoic acid, ethylbenzoic acid, cumic acid, n-propylbenzoic acid, aminobenzoic acid, N,N-dimethylbenzoic acid, acetoxybenzoic acid, salicylic acid, p-t-octylsalicylic acid, oleic acid, elaidic acid, linoleic acid, linolenic acid, thioglycolic acid, mercaptopropionic acid, and octylmercaptopropionic acid, and dicarboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, oxyphthalic acid, chlorophthalic acid, aminophthalic acid, maleic acid, fumaric acid, citraconic acid, mesaconic acid, itaconic acid, aconitic acid, and thiodipropionic acid.

Among the polyalcohols and the partial esters of polyalcohols obtained from mono- or polycarboxylic acids, pentaerythritol adipate, dipentaerythritol adipate, and dipentaerythritol are preferred.

In the resin composition for molding of the present invention, the lower limit of the total amount of the polyalcohol and the partial ester of a polyalcohol is preferably 0.05 parts by weight, more preferably 0.1 parts by weight based on 100 parts by weight of the chlorinated vinyl chloride-based resin. The upper limit thereof is preferably 3 parts by weight, more preferably 2 parts by weight. If the resin composition contains the polyalcohol and/or the partial ester of a polyalcohol in a total amount in this range, stability can be improved.

The lower limit of the total amount of the polyalcohol and the partial ester of a polyalcohol is preferably 1 part by weight, more preferably 2 parts by weight, still more preferably 3.5 parts by weight based on 100 parts by weight of the thermal stabilizer. The upper limit thereof is preferably 150 parts by weight, more preferably 120 parts by weight, still more preferably 20 parts by weight.

The resin composition for molding of the present invention contains a thermal stabilizer.

The thermal stabilizer contains at least one of a compound represented by the formula $Ca_{1-x}Mg_x(OH)_2$ (where x satisfies the inequality $0<x<1$) and a compound represented by the formula $Ca_yMg_yO$ (where y satisfies the inequality $0<y<1$). In the formulae, x is preferably 0.1 or greater and 0.5 or less, and y is preferably 0.1 or greater and 0.5 or less.

In the resin composition for molding of the present invention, the lower limit of the amount of the thermal stabilizer is preferably 0.4 parts by weight, more preferably 0.7 parts by weight based on 100 parts by weight of the chlorinated vinyl chloride-based resin. The upper limit thereof is preferably 10 parts by weight, more preferably 6 parts by weight. If the resin composition contains the thermal stabilizer in an amount in this range, the thermal stability can be further improved and the molded body can maintain its good appearance.

The thermal stabilizer is typically in the form of particles with an average secondary particle size of 0.1 to 3 μm.

The resin composition for molding of the present invention preferably further contains a stabilizing aid. If the resin composition contains a stabilizing aid, the thermal stability can be further improved.

The lower limit of the amount of the stabilizing aid to be added is preferably 0 parts by weight, more preferably 0.01 parts by weight, still more preferably 0.05 parts by weight based on 100 parts by weight of the CPVC. The upper limit thereof is preferably 8 parts by weight, more preferably 5 parts by weight, still more preferably 3 parts by weight.

Examples of the stabilizing aid include organic acid salts, epoxy compounds such as epoxidized soybean oil, epoxidized linseed oil, epoxidized tetrahydrophthalate, and epoxidized polybutadiene, organophosphorus compounds, phosphorous acid esters, phosphoric acid esters, antioxidants, metal hydroxides such as calcium hydroxide and sodium hydroxide, sodium adipate, hydrotalcite, and zeolite. These may be used alone, or in combination of two or more thereof.

Examples of the organic acid salts include sodium salts, calcium salts, magnesium salts, and potassium salts of organic acids. Examples of the organic acids include monovalent carboxylic acids such as acetic acid, propionic acid, butyric acid, valeric acid, caproic acid, enanthic acid, caprylic acid, neodecanoic acid, 2-ethylhexanoic acid, pelargonic acid, capric acid, undecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-t-butylbenzoic acid, dimethylhydroxybenzoic acid, 3,5-di-tert-butyl-4-hydroxybenzoic acid, toluic acid, dimethylbenzoic acid, ethylbenzoic acid, cumic acid, n-propylbenzoic acid, aminobenzoic acid, N,N-dimethylbenzoic acid, acetoxybenzoic acid, salicylic acid, p-t-octylsalicylic acid, oleic acid, elaidic acid, linoleic acid, linolenic acid, thioglycolic acid, mercaptopropionic acid, and octylmercaptopropionic acid, divalent carboxylic acids such as oxalic acid, malonic acid, succinic acid, glutaric acid, adipic acid, pimelic acid, suberic acid, azelaic acid, sebacic acid, phthalic acid, isophthalic acid, terephthalic acid, oxyphthalic acid, chlorophthalic acid, aminophthalic acid, maleic acid, fumaric acid, citraconic acid, mesaconic acid, itaconic acid, aconitic acid, and thiodipropionic acid, monoesters or monoamide compounds thereof, and di- or triester compounds of trivalent or tetravalent carboxylic acids such as hemimellitic acid, trimellitic acid, mellophanic acid, pyromellitic acid, and mellitic acid. Here, all the hydroxy groups in the alcohol component as a material of the esters are esterified.

In order to improve initial coloring properties, the stabilizing aid preferably contains a higher fatty acid salt as an organic acid salt.

Any higher fatty acid can be used. Examples thereof include monovalent carboxylic acids such as acetic acid, propionic acid, butyric acid, valeric acid, caproic acid, enanthic acid, caplyric acid, neodecanoic acid, 2-ethylhexanoic acid, pelargonic acid, capric acid, undecanoic acid, lauric acid, tridecanoic acid, myristic acid, palmitic acid, isostearic acid, stearic acid, 1,2-hydroxystearic acid, behenic acid, montanic acid, benzoic acid, monochlorobenzoic acid, p-t-butylbenzoic acid, dimethylhydroxybenzoic acid, 3,5-di-tert-butyl-4-hydroxybenzoic acid, toluic acid, dimethylbenzoic acid, ethylbenzoic acid, cumic acid, n-propylbenzoic acid, aminobenzoic acid, N,N-dimethylbenzoic acid, acetoxybenzoic acid, salicylic acid, p-t-octylsalicylic acid, oleic acid, elaidic acid, linoleic acid, linolenic acid, thioglycolic acid, mercaptopropionic acid, and octylmercaptopropionic acid, oxalic acid, malonic acid, succinic acid, glutaric acid, adipic acid, pimelic acid, suberic acid, azelaic acid, sebacic acid, phthalic acid, isophthalic acid, terephthalic acid, oxyphthalic acid, chlorophthalic acid, aminophthalic acid, maleic acid, fumaric acid, citraconic acid, mesaconic acid, itaconic acid, aconitic acid, and thiodipropionic acid. In particular, stearic acid, 1,2-hydroxystearic acid, lauric acid, palmitic acid, myristic acid, behenic acid, and montanic acid are preferred.

Examples of the metal component of the higher fatty acid salt include zinc, magnesium, calcium, lithium, and barium. In particular, zinc and magnesium are preferred.

The lower limit of the amount of the higher fatty acid salt to be added is preferably 0.01 parts by weight, more preferably 0.05 parts by weight based on 100 parts by weight of the CPVC. The upper limit thereof is preferably 5.0 parts by weight, more preferably 3.0 parts by weight.

The resin composition for molding of the present invention is preferably free of β-diketone. Conventional thermal stabilizers contain β-diketone in order to improve the thermal stability. If a thermal stabilizer containing β-diketone is used, the molded body of the resin composition produced by extrusion molding or injection molding tends to have impaired appearance. For example, the molded body has, on its surface, yellow to red-brown streaks with a width of about 0.1 to 1 mm parallel to the direction of the flow of resin. Such a molded body with impaired appearance is a defective product. In particular, use of a die that has been used for a long time tends to cause such a defective product. The resin composition of the present invention for molding can exhibit excellent thermal stability without a thermal stabilizer containing β-diketone.

The resin composition for molding according to the present invention, which has the above-described features, can have excellent thermal stability.

The following will describe methods for producing the resin composition for molding and the molded body.

A method for producing the resin composition for molding includes: the step of preparing a chlorinated vinyl chloride-based resin, the step including suspending a vinyl chloride-based resin in an aqueous medium in a reaction container to prepare a suspension, introducing chlorine in the reaction container, and heating the suspension to chlorinate the vinyl chloride-based resin; and the step of mixing the chlorinated vinyl chloride-based resin with a thermal stabilizer and a polyalcohol and/or a partial ester of a polyalcohol, the thermal stabilizer being at least one of a compound represented by the formula $Ca_{1-x}Mg_x(OH)_2$ where x satisfies the inequality $0<x<1$ and a compound represented by the formula $Ca_{1-y}Mg_yO$ where y satisfies the inequality $0<y<1$.

The reaction container to be used in the chlorination reaction may be, for example, a commonly used container such as a glass-lined stainless steel reaction container or a titanium reaction container.

The method for suspending a vinyl chloride-based resin in an aqueous medium to prepare a suspension is not limited.

A cake-like PVC obtained by removing monomers from a polymerized PVC may be used, or a dried PVC may be resuspended in an aqueous medium. Alternatively, a suspension may be used which is obtained by removing substances undesirable for a chlorination reaction from the polymerization system. Preferably, a cake-like PVC obtained by removing monomers from a polymerized PVC is used.

The aqueous medium may be, for example, ion exchange-treated pure water. The amount of the aqueous medium is not limited. The amount is commonly preferably 2 to 10 parts by weight based on 100 parts by weight of PVC.

Chlorine to be introduced to the reaction container may be either liquid chlorine or gaseous chlorine. The use of liquid chlorine is efficient because a large amount of chlorine can be charged in a short period of time. Chlorine may be added during the reaction in order to control the pressure or to supply chlorine. In this case, in addition to liquid chlorine, gaseous chlorine may be appropriately injected. It is preferred to use chlorine from a cylinder after purging 5 to 10% by weight of chlorine therein.

The gauge pressure in the reaction container is not limited. It is preferred that the gauge pressure is in the range of 0.3 to 2 MPa because a higher chlorine pressure allows chlorine to more easily penetrate inside PVC particles.

After chlorine is introduced, the suspension is heated to chlorinate the vinyl chloride-based resin. Thus, a chlorinated vinyl chloride-based resin can be obtained. Heating excites bonds in the PVC and chlorine, thus promoting chlorination. The chlorination is performed without ultraviolet irradiation. In the case of a chlorination reaction by ultraviolet irradiation, the magnitude of light energy needed to chlorinate a PVC greatly depends on the distance between the PVC and the light source. Accordingly, the surface and the inside of the PVC particles receive different amounts of energy, causing non-uniform chlorination.

This results in a CPVC with low uniformity. Chlorination by heating without ultraviolet irradiation enables more uniform chlorination, providing a CPVC with high uniformity.

The heating temperature is preferably within the range of 70° C. to 140° C. If the temperature is too low, the chlorination rate is reduced. If the temperature is too high, a dehydrochlorination reaction occurs simultaneously with a chlorination reaction, resulting in a colored CPVC. The heating temperature is more preferably within the range of 100° C. to 135° C. Any heating method may be used. Examples thereof include heating from the reaction container wall by an external jacket method.

Hydrogen peroxide is preferably added to the suspension in the chlorination reaction. The addition of hydrogen peroxide can increase the rate of chlorination. Preferably, 0.0005 to 0.05 parts by weight of hydrogen oxide based on 100 parts by weight of the PVC is added every hour of reaction time. If the amount is too small, the effect of increasing the rate of chlorination may not be obtained. If the amount is too large, the thermal stability of the CPVC may decrease.

If hydrogen peroxide is added, the rate of chlorination increases, and thus the heating temperature can be relatively low. For example, the heating temperature may be within the range of 65° C. to 110° C.

In the chlorination, the chlorine consumption rate after the chlorine content reaches a value that is five percentage points by weight lower than the final chlorine content is controlled to be in the range of 0.010 to 0.015 kg/PVC-Kg 5 min. The chlorine consumption rate after the chlorine content reaches a value that is three percentage points by weight lower than the final chlorine content is controlled to be in the range of 0.005 to 0.010 kg/PVC-Kg-5 min. As used herein, the term "chlorine consumption rate" refers to the amount of chlorine consumed per kilogram of the material PVC in five minutes.

The CPVC produced by chlorination by the above method can have a final chlorine content of 65% by weight or more and less than 72% by weight. The CPVC also can have, based on the total number of moles of the structural unit (a) —$CCl_2$—, the structural unit (b) —CHCl—, and the structural unit (c) —$CH_2$—, a proportion of the structural unit (a) of 17.5 mol % or less, a proportion of the structural unit (b) of 46.0 mol % or more, and a proportion of the structural unit (c) of 37.0 mol % or less. The CPVC also can have low non-uniformity in the state of chlorination and excellent thermal stability.

A molded body can be obtained by mixing the obtained chlorinated vinyl chloride-based resin with a thermal stabilizer and molding the resulting mixture. The molding method may be any conventionally known production method, such as extrusion molding or injection molding.

The thermal stabilizer may contain other component(s).

In the production process, the CPVC may be optionally mixed with additives such as a stabilizing aid, a lubricant, a processing aid, an impact modifier, a heat resistance improver, an antioxidant, an ultraviolet absorber, a light stabilizer, filler, thermoplastic elastomer, or pigment. The addition of a stabilizing aid can further improve the thermal stability of the molded body.

Any method may be used for mixing the thermal stabilizer and other additives with the CPVC. Examples thereof include hot blending and cold blending.

Any antioxidant may be used. Examples thereof include phenolic antioxidants, phosphoric acid antioxidants, sulfur antioxidants, and amine antioxidants. These may be used alone, or in combination of two or more thereof.

The hydrotalcite compound may be any conventionally known hydrotalcite compound. The hydrotalcite compound may be a natural product or a synthetic product. Suitable hydrotalcite compounds include a double salt compound composed of magnesium and aluminum.

The zeolite compound is an aluminosilicate of an alkali or alkaline earth metal that has a zeolite crystal structure. Examples thereof include A-type, X-type, Y-type, and P-type zeolites, mordenite, analcite, aluminosilicates in the sodalite group, clinoptilolite, erionite, and chabazite.

The hydrotalcite compounds and/or the zeolite compounds may be used alone, or used in combination thereof.

If the amount thereof is small, the thermal stability effect is not exerted. If the amount is large, coloring may occur. The lower limit thereof is preferably 0 parts by weight, more preferably 0.05 parts by weight, still more preferably 0.1 parts by weight based on 100 parts by weight of the CPVC. The upper limit thereof is preferably 2.0 parts by weight, more preferably 1.2 parts by weight, still more preferably 0.8 parts by weight.

Examples of the lubricant include internal lubricants and external lubricants. Internal lubricants are used to reduce the flow viscosity of molten resin in the molding process to prevent friction heating. Any internal lubricant may be used. Examples thereof include butyl stearate, lauryl alcohol, stearyl alcohol, stearic acid, and bisamide. These may be used alone, or in combination of two or more thereof.

External lubricants are used to enhance slipping between molten resin and a metal surface in the molding process. Any external lubricant may be used. Examples thereof include paraffin wax, polyolefin wax, ester wax, and montanic acid wax. These may be used alone, or in combination of two or more thereof.

Any processing aid may be used. Examples thereof include acrylic processing aids such as alkyl acrylate-alkyl methacrylate copolymers with a weight average molecular weight of 100,000 to 2,000,000. Any acrylic processing aid may be used. Examples thereof include n-butyl acrylate-methyl methacrylate copolymers and 2-ethylhexyl acrylate-methyl methacrylate-butyl methacrylate copolymers. These may be used alone, or in combination of two or more thereof.

Any impact modifier may be used. Examples thereof include methyl methacrylate-butadiene-styrene copolymers (MBS), chlorinated polyethylene, and acrylic rubber.

Any heat resistance improver may be used. Examples thereof include α-methylstyrene resins, and N-phenylmaleimide resins.

Any light stabilizer may be used. Examples thereof include hindered amine light stabilizers.

Any ultraviolet absorber may be used. Examples thereof include salicylic acid ester ultraviolet absorbers, benzophenone ultraviolet absorbers, benzotriazole ultraviolet absorbers, and cyanoacrylate ultraviolet absorbers.

Any filler may be used. Examples thereof include calcium carbonate and talc.

Any pigment may be used. Examples thereof include organic pigments such as azo pigments, phthalocyanine pigments, indanthrene pigments, and dye lake pigments; and inorganic pigments such as oxide pigments, sulfide/selenidepigments, and ferrocyanide pigments.

The molded body may contain a plasticizer in order to improve the processability in molding. The use of a plasticizer in a large amount is not so preferable because it may reduce the thermal stability of the molded body. Any plasticizer may be used. Examples thereof include dibutyl phthalate, di-2-ethylhexyl phthalate, and di-2-ethylhexyl adipate.

The molded body may contain a thermoplastic elastomer in order to improve workability. Any thermoplastic elastomer may be used. Examples thereof include vinyl chloride thermoplastic elastomers such as acrylonitrile-butadiene (NBR) copolymers, ethylene-vinyl acetate (EVA) copolymers, ethylene-vinyl acetate-carbon monoxide (EVACO) copolymers, vinyl chloride-vinyl acetate copolymers, and vinyl chloride-vinylidene chloride copolymers, and styrene thermoplastic elastomers, olefin thermoplastic elastomers, urethane thermoplastic elastomers, polyester thermoplastic elastomers, and polyamide thermoplastic elastomers. These thermoplastic elastomers may be used alone, or in combination of two or more thereof.

The above methods can provide a resin composition for molding having excellent thermal stability and a molded body molded from the resin composition.

EXAMPLES

The following will describe embodiments of the present invention with reference to examples. The present invention should not be limited to the examples.

Example 1

Preparation of Chlorinated Vinyl Chloride Resin

A glass-lined reaction container with an internal volume of 300 L was charged with 200 kg of ion-exchanged water and 56 kg of vinyl chloride resin with an average degree of polymerization of 1000. The mixture was stirred, and water was added to the reaction container, so that the mixture was dispersed in the water. Subsequently, the temperature was increased to 90° C. while the pressure was reduced to remove oxygen in the reaction container.

Then, chlorine was fed to the reaction container to achieve a partial pressure of chlorine of 0.4 MPa, and a chlorination reaction was performed while 0.2% by weight hydrogen peroxide was added at a rate of 1 part by weight per hour (320 ppm/hour). The reaction was continued until the chlorine content of the chlorinated vinyl chloride resin reached 61% by weight. When the chlorine content of the chlorinated vinyl chloride resin reached 61% by weight (five percentage points by weight lower than the final chlorine content), the addition amount of 0.2% by weight hydrogen peroxide was reduced to 0.1 parts by weight per hour (200 ppm/hour), and chlorination was allowed to proceed at an average chlorine consumption rate of 0.012 kg/PVC-kg-5 min. When the chlorine content reached 63% by weight (three percentage points by weight lower than the final chlorine content), the addition amount of 0.2% by weight hydrogen peroxide was reduced to 150 ppm/per hour, and chlorination was allowed to proceed at an average chlorine consumption rate of 0.008 kg/PVC-kg 5 min. In this manner, a chlorinated vinyl chloride resin with a chlorine content of 65.6% by weight was obtained.

(Preparation of Thermal Stabilizer)

A compound of the formula $Ca_{0.9}Mg_{0.1}(OH)_2$ was prepared to be used as a thermal stabilizer.

A beaker with a volume of 2 L was charged with 1 L of 1 mol/L $Ca(OH)_2$ slurry. An amount of 500 mL of a 0.2 mol/L aqueous solution of $MgCl_2$ was added thereto with stirring at 30° C. The reaction product was filtered and washed with water. Thereafter, the resulting cake was dispersed in 1 L of water. The dispersion was heated to about 80° C. With stirring, a solution of 1 g of sodium stearate in 100 mL of warm water (about 80° C.) was added to the dispersion, whereby surface treatment was performed. The resulting product was filtered and washed with water, and then dried. The dried product was subjected to a chemical composition analysis by ICP emission spectrometry. The chemical composition analysis confirmed that the obtained compound was $Ca_{0.9}Mg_{0.1}(OH)_2$.

(Preparation of Chlorinated Vinyl Chloride-Based Resin Molded Body)

A chlorinated vinyl chloride resin composition was prepared using the obtained chlorinated vinyl chloride resin, the thermal stabilizer, and a partial ester of a polyalcohol. The thermal stabilizer was used in a proportion of 3.0 parts by weight, and the polyalcohol was used in a proportion of 0.3 parts by weight, each based on 100 parts by weight of the chlorinated vinyl chloride resin. The partial ester of a polyalcohol used was dipentaerythritol adipate. Additionally, 0.3 parts by weight of sodium adipate ("B-NT/7222" available from REAGENS) as a stabilizing aid, 5 parts by weight of MBS ("Kane Ace M-511" available from Kaneka Corporation) as an impact modifier, 2 parts by weight of a polyethylene lubricant ("Hiwax220MP" available from Mitsui Chemicals, Inc.), and 0.3 parts by weight of a fatty acid ester lubricant ("LOXIOL G-32" available from Emery Oleochemicals Japan Ltd.) were used. These components were uniformly mixed in a super mixer, whereby a chlorinated vinyl chloride resin composition was obtained.

A measurement in accordance with JIS K 0070 (1992) confirmed that the dipentaerythritol adipate had a hydroxy value of 900, and that a part of the hydroxy groups was not esterified.

The obtained chlorinated vinyl chloride resin composition was fed to a conical counter-rotating twin-screw extruder ("SLM-50" available from Osada Seisakusho) with a diameter of 50 mm. A pipe-shaped molded body with an outer diameter of 20 mm and a thickness of 3 mm was prepared at a resin temperature of 205° C.

Example 2

A chlorinated vinyl chloride resin and a molded body were prepared in the same manner as in Example 1 except that the amount of the thermal stabilizer was changed as shown in Table 1.

Example 3

A chlorinated vinyl chloride resin and a molded body were prepared in the same manner as in Example 1 except that a compound of the formula $Ca_{0.9}Mg_{0.1}O$ was used as a thermal stabilizer instead of a compound of the formula $Ca_{0.9}Mg_{0.1}(OH)_2$.

Example 4

A chlorinated vinyl chloride resin and a molded body were prepared in the same manner as in Example 1 except that the amount of dipentaerythritol adipate was changed as shown in Table 1.

Example 5

A chlorinated vinyl chloride resin and a molded body were prepared in the same manner as in Example 1 except that the chlorine content and the molecular structure proportion of the chlorinated vinyl chloride resin were changed as shown in Table 1, and that 0.5 parts by weight of hydrotalcite was used as a stabilizing aid instead of 0.3 parts by weight of sodium adipate.

Example 6

A chlorinated vinyl chloride resin and a molded body were prepared in the same manner as in Example 1 except that the chlorine content and the molecular structure proportion of the chlorinated vinyl chloride resin were changed as shown in Table 1, that a compound of the formula $Ca_{0.5}Mg_{0.5}(OH)_2$ was used as a thermal stabilizer instead of a compound of the formula $Ca_{0.9}Mg_{0.1}(OH)_2$, and that 0.5 parts by weight of hydrotalcite was used as a stabilizing aid instead of 0.3 parts by weight of sodium adipate.

Example 7

A chlorinated vinyl chloride resin and a molded body were prepared in the same manner as in Example 1 except that the chlorine content and the molecular structure proportion of the chlorinated vinyl chloride resin were changed as shown in Table 1, that 7.0 parts by weight of a compound of the formula $Ca_{0.9}Mg_{0.1}O$ was used as a thermal stabilizer instead of 3.0 parts by weight of a compound of the formula $Ca_{0.9}Mg_{0.1}(OH)_2$, that dipentaerythritol was used instead of dipentaerythritol adipate, and that 0.5 parts by weight of hydrotalcite was used as a stabilizing aid instead of 0.3 parts by weight of sodium adipate.

Example 8

A chlorinated vinyl chloride resin and a molded body were prepared in the same manner as in Example 1 except that the chlorine content and the molecular structure proportion of the chlorinated vinyl chloride resin were changed as shown in Table 1, and that dipentaerythritol was used instead of dipentaerythritol adipate.

Example 9

A chlorinated vinyl chloride resin and a molded body were prepared in the same manner as in Example 1 except that the chlorine content and the molecular structure proportion of the chlorinated vinyl chloride resin were changed as shown in Table 1, that 7.0 parts by weight of a compound of the formula $Ca_{0.5}Mg_{0.5}(OH)_2$ was used as a thermal stabilizer instead of 3.0 parts by weight of a compound of the formula $Ca_{0.9}Mg_{0.1}(OH)_2$, and that dipentaerythritol was used instead of dipentaerythritol adipate.

Example 10

A chlorinated vinyl chloride resin and a molded body were prepared in the same manner as in Example 1 except that the chlorine content and the molecular structure proportion of the chlorinated vinyl chloride resin were changed as shown in Table 1, that a compound of the formula $Ca_{0.9}Mg_{0.1}O$ was used as a thermal stabilizer instead of a compound of the formula $Ca_{0.9}Mg_{0.1}(OH)_2$, and that dipentaerythritol was used instead of dipentaerythritol adipate.

Example 11

A chlorinated vinyl chloride resin and a molded body were prepared in the same manner as in Example 1 except that the chlorine content and the molecular structure proportion of the chlorinated vinyl chloride resin were changed as shown in Table 1, and that dipentaerythritol was used instead of dipentaerythritol adipate.

Example 12

A chlorinated vinyl chloride resin and a molded body were prepared in the same manner as in Example 1 except that the amount of dipentaerythritol adipate was changed to 2.3 parts by weight.

Example 13

A chlorinated vinyl chloride resin and a molded body were prepared in the same manner as in Example 1 except that 0.3 parts by weight of sodium adipate and 0.5 parts by weight of β-diketone were used in combination as stabilizing aids.

Example 14

A chlorinated vinyl chloride resin and a molded body were prepared in the same manner as in Example 1 except that the amount of the thermal stabilizer was changed as shown in Table 1.

Example 15

A chlorinated vinyl chloride resin and a molded body were prepared in the same manner as in Example 1 except that the amount of the thermal stabilizer was changed as shown in Table 1.

Example 16

A chlorinated vinyl chloride resin and a molded body were prepared in the same manner as in Example 1 except that 0.2 parts by weight of dipentaerythritol adipate and 0.1 parts by weight of dipentaerythritol were used instead of 0.3 parts by weight of dipentaerythritol adipate.

Example 17

A chlorinated vinyl chloride resin and a molded body were prepared in the same manner as in Example 1 except that pentaerythritol adipate was used instead of dipentaerythritol adipate.

A measurement performed in the same manner as in Example 1 confirmed that the pentaerythritol adipate had a hydroxy value of 880 and that a part of the hydroxy groups was not esterified.

Example 18

A chlorinated vinyl chloride resin and a molded body were prepared in the same manner as in Example 1 except that 0.3 parts by weight of magnesium stearate was used as a stabilizing aid.

Example 19

A chlorinated vinyl chloride resin and a molded body were prepared in the same manner as in Example 1 except that 4.0 parts by weight of magnesium stearate was used as a stabilizing aid.

Example 20

A chlorinated vinyl chloride resin and a molded body were prepared in the same manner as in Example 1 except that 0.3 parts by weight of magnesium stearate was further used as a stabilizing aid.

Example 21

A chlorinated vinyl chloride resin and a molded body were prepared in the same manner as in Example 1 except that 0.3 parts by weight of zinc stearate was used as a stabilizing aid.

Example 22

A chlorinated vinyl chloride resin and a molded body were prepared in the same manner as in Example 1 except that 4.0 parts by weight of zinc stearate was used as a stabilizing aid.

Comparative Example 1

A chlorinated vinyl chloride resin and a molded body were prepared in the same manner as in Example 1 except that the chlorine content and the molecular structure proportion of the chlorinated vinyl chloride resin were changed as shown in Table 1.

Comparative Example 2

A chlorinated vinyl chloride resin and a molded body were prepared in the same manner as in Example 1 except that the chlorine content and the molecular structure proportion of the chlorinated vinyl chloride resin were changed as shown in Table 1.

Comparative Example 3

A chlorinated vinyl chloride resin and a molded body were prepared in the same manner as in Example 1 except that a compound of the formula $Ca_{0.0}Mg_{1.0}(OH)_2$ was used as a thermal stabilizer instead of a compound of the formula $Ca_{0.9}Mg_{0.1}(OH)_2$.

Comparative Example 4

A chlorinated vinyl chloride resin and a molded body were prepared in the same manner as in Example 1 except that a compound of the formula $Ca_{1.0}Mg_{0.0}(OH)_2$ was used as a thermal stabilizer instead of a compound of the formula $Ca_{0.9}Mg_{0.1}(OH)_2$.

Comparative Example 5

A chlorinated vinyl chloride resin and a molded body were prepared in the same manner as in Example 1 except that the chlorine content and the molecular structure proportion of the chlorinated vinyl chloride resin were changed as shown in Table 1, that a compound of the formula $Ca_{0.5}Mg_{0.5}(OH)_2$ was used as a thermal stabilizer instead of a compound of the formula $Ca_{0.9}Mg_{0.1}(OH)_2$, and that dipentaerythritol adipate was not used.

Comparative Example 6

A chlorinated vinyl chloride resin and a molded body were prepared in the same manner as in Example 1 except that the molecular structure proportion of the chlorinated vinyl chloride resin was changed as shown in Table 1.

Comparative Example 7

A chlorinated vinyl chloride resin and a molded body were prepared in the same manner as in Example 1 except that the chlorine content and the molecular structure proportion of the chlorinated vinyl chloride resin were changed as shown in Table 1.

Comparative Example 8

A chlorinated vinyl chloride resin and a molded body were prepared in the same manner as in Example 1 except that the chlorine content and the molecular structure proportion of the chlorinated vinyl chloride resin were changed as shown in Table 1.

Comparative Example 9

A chlorinated vinyl chloride resin and a molded body were prepared in the same manner as in Example 1 except that 2,4-diamino-6-hydroxypyrimidine (DHAP) was used as a thermal stabilizer instead of a compound of the formula $Ca_{0.9}Mg_{0.1}(OH)_2$.

Comparative Example 10

A chlorinated vinyl chloride resin and a molded body were prepared in the same manner as in Example 1 except that the molecular structure proportion of the chlorinated vinyl chloride resin was changed as shown in Table 1, and that DHAP was used as a thermal stabilizer instead of a compound of the formula $Ca_{0.9}Mg_{0.1}(OH)_2$.

Comparative Example 11

A chlorinated vinyl chloride resin and a molded body were prepared in the same manner as in Example 1 except that the chlorine content and the molecular structure proportion of the chlorinated vinyl chloride resin were changed as shown in Table 1, and that DHAP was used as a thermal stabilizer instead of a compound of the formula $Ca_{0.9}Mg_{0.1}(OH)_2$.

Comparative Example 12

A chlorinated vinyl chloride resin and a molded body were prepared in the same manner as in Example 1 except that the chlorine content and the molecular structure proportion of the chlorinated vinyl chloride resin were changed as shown in Table 1, and that 0.3 parts by weight of sodium adipate and 0.5 parts by weight of β-diketone were used in combination as stabilizing aids.

Comparative Example 13

A chlorinated vinyl chloride resin and a molded body were prepared in the same manner as in Example 1 except that the chlorine content and the molecular structure proportion of the chlorinated vinyl chloride resin were changed as shown in Table 1.

[Analysis]

The chlorine content, the UV absorbance, and the dehydrochlorination time of each of the chlorinated vinyl chloride resins according to the examples and the comparative examples were measured. The amounts (mol %) of —CCl$_2$—, —CHCl—, and —CH$_2$— and the amount (mol %) of a sequence of four or more VC units were also measured by a molecular structure analysis.

The measurement methods are described below. Table 1 shows the results.

<Chlorine Content Measurement>

The chlorine content was measured in accordance with JIS K 7229.

<Molecular Structure Analysis>

The measurement was performed in accordance with the NMR measurement method disclosed in R. A. Komoroski, R. G. Parker, J. P. Shocker, Macromolecules, 1985, 18, 1257-1265.

The NMR measurement was performed under the following conditions.
Device: FT-NMR (JNM-AL-300, available from JEOL Ltd.)
Observed nucleus: 13C (complete proton decoupling)
Pulse width: 90°
PD: 2.4 sec
Solvent: o-dichlorobenzene:deuterated benzene (C5D5)=3:1
Sample concentration: about 20%
Temperature: 110° C.
Standard: The central signal of benzene was taken as 128 ppm.
Number of accumulations: 20,000

<Measurement of UV Absorbance (216 nm)>

The UV absorbance at 216 nm was measured under the following conditions.
Device: recording spectrophotometer (U-3500, available from Hitachi, Ltd.)
Solvent: THF
Concentration: sample 20 mg/THF 25 mL . . . 800 ppm (Examples 1 to 7 and 12 to 19 and Comparative Examples 1, 3, 4, 6, and 8 to 13),
sample 10 mg/THF 25 mL . . . 400 ppm (Examples 8 to 11 and Comparative Examples 2, 5, and 7)

<Dehydrochlorination Time>

One gram of the obtained chlorinated vinyl chloride resin was put in a test tube and heated at 190° C. using an oil bath. Generated HCl gas was recovered and dissolved in 100 mL of ion-exchanged water. The pH was measured. How many grams of HCl were generated per 1,000,000 g of the chlorinated vinyl chloride resin was calculated from the pH. The time it took for this value to reach 7000 ppm was measured.

[Evaluation]

The static thermal stability, the dynamic thermal stability, and the mechanical properties of the chlorinated vinyl chloride resins according to the examples and the comparative examples were measured. The appearance of the molded bodies was observed. The measurement methods are described below. Table 1 shows the results. Numbers without units in the table are in parts by weight.

<Static Thermal Stability>

Each of the chlorinated vinyl chloride resin compositions according to the examples and the comparative examples was fed into a roll mill with two 8-inch rolls. The resin composition was kneaded at 205° C. for three minutes and formed into a sheet with a thickness of 1.0 mm. The obtained sheet was heated in a gear oven at 200° C. The coloring initiation time (minutes) and the foaming or blackening time (minutes) were measured. The time at which yellowing started was taken as the coloring initiation time. The time before foaming or blackening was taken as the foaming/blackening time.

<Dynamic Thermal Stability>

Each of the chlorinated vinyl chloride resin compositions according to the examples and the comparative examples was fed into a plastomill ("Labo PlastoMill" available from Toyo Seiki Seisaku-Sho, Ltd.) and kneaded at 50 rpm, 195° C., and a filling amount of 63 g. The gelling time (seconds) was measured. The time from when kneading was started to when the kneading torque reached its peak was taken as the gelling time. After gelling, kneading and heating were continued, and the decomposition time (minutes) of the chlorinated vinyl chloride resin was measured. The time from when kneading was started to when the kneading torque, which was stable after gelling, started to rise again was taken as the decomposition time.

<Mechanical Properties (Izod Impact Strength, Tensile Strength, Tensile Modulus, Thermal Deformation Temperature)>

Each of the chlorinated vinyl chloride resin compositions according to the examples and the comparative examples was fed into a roll mill with two 8-inch rolls. The resin composition was kneaded at 205° C. for three minutes and formed into sheets with a thickness of 1.0 mm. The obtained sheets were layered on top of each other, preheated with a press at 205° C. for three minutes, and then pressurized for four minutes. Thus, a press plate with a thickness of 3 mm was obtained. A specimen was cut out from the obtained press plate by machine processing. The tensile strength and the tensile modulus were measured using this specimen in accordance with ASTM D638. The thermal deformation temperature was also measured at a load of 186 N/cm² in accordance with ASTM D648. The thermal deformation temperature was measured after the press plate was annealed in a gear oven at 90° C. for 24 hours.

<Observation of Appearance of Molded Body>

Each of the pipe-shaped molded bodies according to the examples and the comparative examples was air-cooled at room temperature for five minutes. Thereafter, the surface state was visually observed for the presence or absence of bubbles, the presence or absence of streaks, and the presence or absence of scorching (discoloration).

<Results>

The resin compositions according to Examples 1 to 22 exhibited higher thermal stability and higher mechanical properties than those according to the comparative examples. In the molded bodies according to Examples 1 to 12, 14, and 16 to 22, almost no bubbles, streaks, or scorch were observed, showing that these molded bodies had better appearance than those according to the comparative examples.

In Example 12, the thermal deformation temperature was relatively low. This shows that a higher total amount of a polyalcohol and a partial ester of a polyalcohol tends to lead to a lower thermal deformation temperature.

Example 13 employed β-diketone as a stabilizing aid. In Example 13, streaks were observed in the appearance of the molded body. This shows that the molded body containing β-diketone tends to have impaired appearance. The results of Examples 1 to 11 show that according to the present invention, sufficient thermal stability and mechanical properties can be obtained without β-diketone.

In Example 14, the thermal stability was a little lower than in Example 1. This shows that a thermal stabilizer content of 0.4 parts by weight or more leads to an even higher thermal stability.

In Example 15, the thermal stability was higher than in Example 1, but streaks were observed in the appearance of the molded body. This shows that a thermal stabilizer content of 10 parts by weight or less enables both high thermal stability and good appearance of the molded body.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Chlorinated vinyl chloride resin | Chlorine content (% by weight) | 65.6 | 65.6 | 65.6 | 65.6 | 68.3 | 68.3 | 68.3 | 70.6 | 70.6 |
| | Molecular structure proportion —$CCl_2$— (mol %) | 5.7 | 5.7 | 5.7 | 5.7 | 7.5 | 7.5 | 7.5 | 16.9 | 16.9 |
| | —CHCl— (mol %) | 60.1 | 60.1 | 60.1 | 60.1 | 65 | 65 | 65 | 55.1 | 55.1 |
| | —$CH_2$— (mol %) | 34.2 | 34.2 | 34.2 | 34.2 | 27.5 | 27.5 | 27.5 | 28.0 | 28.0 |
| | Sequence of four or more VC units (mol %) | 26.4 | 26.4 | 26.4 | 26.4 | 23.6 | 23.6 | 23.6 | 15.9 | 15.9 |
| | UV absorbance (216 nm) | 0.7 | 0.7 | 0.7 | 0.7 | 0.8 | 0.8 | 0.8 | 5.3 | 5.3 |
| | Dehydrochlorination time (seconds) | 90 | 90 | 90 | 90 | 95 | 95 | 95 | 148 | 148 |
| Thermal stabilizer | $Ca_{0.9}Mg_{0.1}(OH)_2$ | 3.0 | 7.0 | — | 3.0 | 3.0 | — | — | 3.0 | — |
| | $Ca_{0.5}Mg_{0.5}(OH)_2$ | — | — | — | — | — | 3.0 | — | — | 7.0 |
| | $Ca_{0.9}Mg_{0.1}O$ | — | — | 3.0 | — | — | — | 7.0 | — | — |
| | $Ca_{1.0}Mg_{0.0}(OH)_2$ | — | — | — | — | — | — | — | — | — |
| | $Ca_{0.0}Mg_{1.0}(OH)_2$ | — | — | — | — | — | — | — | — | — |
| | DHAP | — | — | — | — | — | — | — | — | — |
| Polyalcohol or partial ester thereof | Dipentaerythritol adipate | 0.3 | 0.3 | 0.3 | 1.8 | 0.3 | 0.3 | — | 0.3 | 0.3 |
| | Dipentaerythritol | — | — | — | — | — | — | 0.3 | — | — |
| | Pentaerythritol adipate | — | — | — | — | — | — | — | — | — |
| Stabilizing aid | Sodium adipate | 0.3 | 0.3 | 0.3 | 0.3 | — | — | — | 0.3 | 0.3 |
| | Magnesium stearate | — | — | — | — | — | — | — | — | — |
| | Zinc stearate | — | — | — | — | — | — | — | — | — |
| | Hydrotalcite | — | — | — | — | 0.5 | 0.5 | 0.5 | — | — |
| | β diketone | — | — | — | — | — | — | — | — | — |
| Thermal stability evaluation | Static thermal stability  Coloring initiation time (minutes) | 30 | 40 | 30 | 30 | 30 | 40 | 40 | 30 | 40 |
| | Foaming/blackening time (minutes) | 90 | 100 | 90 | 100 | 90 | 80 | 80 | 80 | 80 |
| | Dynamic thermal stability  Gelling time (seconds) | 98 | 95 | 93 | 91 | 85 | 88 | 87 | 93 | 92 |
| | Decomposition time (minutes) | 15 | 13 | 14 | 16 | 14 | 14 | 13 | 15 | 13 |
| Mechanical properties | Tensile strength (MPa) | 55.1 | 54.8 | 55.3 | 53.9 | 58.1 | 60.5 | 61.1 | 62.4 | 62.1 |
| | Tensile modulus (MPa) | 2850 | 2780 | 2810 | 2770 | 2830 | 2890 | 2940 | 2990 | 2950 |
| | Thermal deformation temperature (° C.) | 108 | 107 | 107 | 106 | 114 | 116 | 116 | 124 | 124 |
| Appearance of molded body | Foaming | Absence | Absence | Absence | Absence | Absence | Absence | Absence | Absence | Absence |
| | Streaks | Absence | Absence | Absence | Absence | Absence | Absence | Absence | Absence | Absence |
| | Scorching | Absence | Absence | Absence | Absence | Absence | Absence | Absence | Absence | Absence |

| | | Example | | | | | | | | |
|---|---|---|---|---|---|---|---|---|---|---|
| | | 10 | 11 | 12 | 13 | 14 | 15 | 16 | 17 | 18 |
| Chlorinated vinyl chloride resin | Chlorine content (% by weight) | 70.6 | 71.8 | 65.6 | 65.6 | 65.6 | 65.6 | 65.6 | 65.6 | 65.6 |
| | Molecular structure proportion —$CCl_2$— (mol %) | 16.9 | 17.3 | 5.7 | 5.7 | 5.7 | 5.7 | 5.7 | 5.7 | 5.7 |
| | —CHCl— (mol %) | 55.1 | 58.9 | 60.1 | 60.1 | 60.1 | 60.1 | 60.1 | 60.1 | 60.1 |
| | —$CH_2$— (mol %) | 28.0 | 23.8 | 34.2 | 34.2 | 34.2 | 34.2 | 34.2 | 34.2 | 34.2 |
| | Sequence of four or more VC units (mol %) | 15.9 | 13.9 | 26.4 | 26.4 | 26.4 | 26.4 | 26.4 | 26.4 | 26.4 |
| | UV absorbance (216 nm) | 5.3 | 5.8 | 0.7 | 0.7 | 0.7 | 0.7 | 0.7 | 0.7 | 0.7 |
| | Dehydrochlorination time (seconds) | 148 | 160 | 90 | 90 | 90 | 90 | 90 | 90 | 90 |
| Thermal stabilizer | $Ca_{0.9}Mg_{0.1}(OH)_2$ | — | 3.0 | 3.0 | 3.0 | 0.3 | 11.0 | 3.0 | 3.0 | 3.0 |
| | $Ca_{0.5}Mg_{0.5}(OH)_2$ | — | — | — | — | — | — | — | — | — |
| | $Ca_{0.9}Mg_{0.1}O$ | 3.0 | — | — | — | — | — | — | — | — |
| | $Ca_{1.0}Mg_{0.0}(OH)_2$ | — | — | — | — | — | — | — | — | — |
| | $Ca_{0.0}Mg_{1.0}(OH)_2$ | — | — | — | — | — | — | — | — | — |
| | DHAP | — | — | — | — | — | — | — | — | — |
| Polyalcohol or partial ester thereof | Dipentaerythritol adipate | — | — | 2.3 | 0.3 | 0.3 | 0.3 | 0.2 | — | 0.3 |
| | Dipentaerythritol | 0.3 | 0.3 | — | — | — | — | 0.1 | — | — |
| | Pentaerythritol adipate | — | — | — | — | — | — | — | 0.3 | — |
| Stabilizing aid | Sodium adipate | 0.3 | 0.3 | 0.3 | 0.3 | 0.3 | 0.3 | 0.3 | 0.3 | — |
| | Magnesium stearate | — | — | — | — | — | — | — | — | 0.3 |
| | Zinc stearate | — | — | — | — | — | — | — | — | — |

TABLE 1-continued

|  |  |  |  |  |  |  |  |  |  |  |  |
|---|---|---|---|---|---|---|---|---|---|---|---|
|  |  | Hydrotalcite | — | — | — | — | — | — | — | — | — |
|  |  | β diketone | — | — | — | 0.5 | — | — | — | — | — |
| Thermal stability evaluation | Static thermal stability | Coloring initiation time (minutes) | 30 | 30 | 30 | 30 | 30 | 50 | 30 | 30 | 40 |
|  |  | Foaming/blackening time (minutes) | 80 | 90 | 90 | 80 | 60 | 110 | 90 | 80 | 90 |
|  | Dynamic thermal stability | Gelling time (seconds) | 89 | 90 | 88 | 88 | 83 | 106 | 95 | 90 | 105 |
|  |  | Decomposition time (minutes) | 14 | 15 | 15 | 16 | 11 | 30 | 15 | 13 | 14 |
| Mechanical properties | Tensile strength (MPa) |  | 62.2 | 63.2 | 52.1 | 54.2 | 55.8 | 52.6 | 54.8 | 55.5 | 54.9 |
|  | Tensile modulus (MPa) |  | 2920 | 3020 | 2720 | 2810 | 2880 | 2700 | 2820 | 2910 | 2780 |
|  | Thermal deformation temperature (° C.) |  | 123 | 128 | 98 | 107 | 109 | 106 | 108 | 109 | 108 |
| Appearance of molded body | Foaming |  | Absence | Absence | Absence | Absence | Absence | Absence | Absence | Absence | Absence |
|  | Streaks |  | Absence | Absence | Absence | Presence | Absence | Presence | Absence | Absence | Absence |
|  | Scorching |  | Absence | Absence | Absence | Absence | Absence | Absence | Absence | Absence | Absence |

|  |  |  | Example |  |  |  | Comparative Example |  |  |  |  |
|---|---|---|---|---|---|---|---|---|---|---|---|
|  |  |  | 19 | 20 | 21 | 22 | 1 | 2 | 3 | 4 | 5 |
| Chlorinated vinyl chloride resin | Chlorine content (% by weight) |  | 65.6 | 65.6 | 65.6 | 65.6 | 62.9 | 73.4 | 65.6 | 65.6 | 70.6 |
|  | Molecular structure proportion | —$CCl_2$— (mol %) | 5.7 | 5.7 | 5.7 | 5.7 | 5.1 | 19.7 | 5.7 | 5.7 | 16.9 |
|  |  | —CHCl— (mol %) | 60.1 | 60.1 | 60.1 | 60.1 | 53.7 | 61.5 | 60.1 | 60.1 | 55.1 |
|  |  | —$CH_2$— (mol %) | 34.2 | 34.2 | 34.2 | 34.2 | 41.2 | 18.8 | 34.2 | 34.2 | 28.0 |
|  | Sequence of four or more VC units (mol %) |  | 26.4 | 26.4 | 26.4 | 26.4 | 33.2 | 11.4 | 26.4 | 26.4 | 15.9 |
|  | UV absorbance (216 nm) |  | 0.7 | 0.7 | 0.7 | 0.7 | 1.3 | 8.9 | 0.7 | 0.7 | 5.3 |
|  | Dehydrochlorination time (seconds) |  | 90 | 90 | 90 | 90 | 55 | 65 | 90 | 90 | 148 |
| Thermal stabilizer | $Ca_{0.9}Mg_{0.1}(OH)_2$ |  | 7.0 | 3.0 | 7.0 | 7.0 | 3.0 | 3.0 | — | — | — |
|  | $Ca_{0.5}Mg_{0.5}(OH)_2$ |  | — | — | — | — | — | — | — | — | 3.0 |
|  | $Ca_{0.9}Mg_{0.1}O$ |  | — | — | — | — | — | — | — | — | — |
|  | $Ca_{1.0}Mg0.0(OH)_2$ |  | — | — | — | — | — | — | — | 3.0 | — |
|  | $Ca_{0.0}Mg_{1.0}(OH)_2$ |  | — | — | — | — | — | — | 3.0 | — | — |
|  | DHAP |  | — | — | — | — | — | — | — | — | — |
| Polyalcohol or partial ester thereof | Dipentaerythritol adipate |  | 0.3 | 0.3 | 0.3 | 0.3 | 0.3 | 0.3 | 0.3 | 0.3 | 0 |
|  | Dipentaerythritol |  | — | — | — | — | — | — | — | — | — |
|  | Pentaerythritol adipate |  | — | — | — | — | — | — | — | — | — |
| Stabilizing aid | Sodium adipate |  | — | 0.3 | — | — | 0.3 | 0.3 | 0.3 | 0.3 | 0.3 |
|  | Magnesium stearate |  | 4.0 | 0.3 | — | — | — | — | — | — | — |
|  | Zinc stearate |  | — | — | 0.3 | 4.0 | — | — | — | — | — |
|  | Hydrotalcite |  | — | — | — | — | — | — | — | — | — |
|  | β diketone |  | — | — | — | — | — | — | — | — | — |
| Thermal stability evaluation | Static thermal stability | Coloring initiation time (minutes) | 50 | 40 | 50 | 60 | 10 | 10 | 10 | 10 | 10 |
|  |  | Foaming/blackening time (minutes) | 100 | 90 | 90 | 100 | 40 | 30 | 30 | 30 | 50 |
|  | Dynamic thermal stability | Gelling time (seconds) | 113 | 106 | 105 | 114 | 85 | 90 | 96 | 97 | 96 |
|  |  | Decomposition time (minutes) | 12 | 13 | 13 | 12 | 7 | 6 | 6 | 5 | 9 |
| Mechanical properties | Tensile strength (MPa) |  | 54.2 | 54.8 | 54.5 | 54.3 | 51.8 | 65.8 | 55.0 | 55.2 | 62.5 |
|  | Tensile modulus (MPa) |  | 2720 | 2780 | 2770 | 2720 | 2730 | 3070 | 2860 | 2910 | 2980 |
|  | Thermal deformation temperature (° C.) |  | 107 | 108 | 108 | 107 | 98 | 132 | 108 | 108 | 124 |
| Appearance of molded body | Foaming |  | Absence | Absence | Absence | Absence | Absence | Presence | Presence | Presence | Presence |
|  | Streaks |  | Absence | Absence | Absence | Absence | Absence | Absence | Absence | Absence | Absence |
|  | Scorching |  | Absence | Absence | Absence | Absence | Absence | Presence | Presence | Presence | Presence |

|  |  |  | Comparative Example |  |  |  |  |  |  |  |
|---|---|---|---|---|---|---|---|---|---|---|
|  |  |  | 6 | 7 | 8 | 9 | 10 | 11 | 12 | 13 |
| Chlorinated vinyl chloride resin | Chlorine content (% by weight) |  | 65.6 | 70.6 | 56.8 | 65.6 | 65.6 | 56.8 | 56.8 | 62.9 |
|  | Molecular structure proportion | —$CCl_2$— (mol %) | 8.8 | 18.1 | 0 | 5.7 | 8.8 | 0 | 0 | 0.7 |
|  |  | —CHCl— (mol %) | 53.8 | 52.7 | 50 | 60.1 | 53.8 | 50 | 50 | 62.4 |

TABLE 1-continued

| | | | | | | | | | |
|---|---|---|---|---|---|---|---|---|---|
| | —$CH_2$— (mol %) | 37.4 | 29.2 | 50 | 34.2 | 37.4 | 50 | 50 | 36.8 |
| | Sequence of four or more VC units (mol %) | 33.7 | 16.8 | 100 | 26.4 | 33.7 | 100 | 100 | 33.2 |
| | UV absorbance (216 nm) | 1.3 | 8.2 | 0 | 0.7 | 1.3 | 0 | 0 | 1.3 |
| | Dehydrochlorination time (seconds) | 52 | 96 | 20 | 90 | 52 | 20 | 20 | 55 |
| Thermal stabilizer | $Ca_{0.9}Mg_{0.1}(OH)_2$ | 3.0 | 3.0 | 3.0 | — | — | — | 3.0 | 3.0 |
| | $Ca_{0.5}Mg_{0.5}(OH)_2$ | — | — | — | — | — | — | — | — |
| | $Ca_{0.9}Mg_{0.1}O$ | — | — | — | — | — | — | — | — |
| | $Ca_{1.0}Mg0.0(OH)_2$ | — | — | — | — | — | — | — | — |
| | $Ca_{0.0}Mg_{1.0}(OH)_2$ | — | — | — | — | — | — | — | — |
| | DHAP | — | — | — | 0.3 | 0.3 | 0.3 | — | — |
| Polyalcohol or partial ester thereof | Dipentaerythritol adipate | 0.3 | 0.3 | 0.3 | 0.3 | 0.3 | 0.3 | 0.3 | 0.3 |
| | Dipentaerythritol | — | — | — | — | — | — | — | — |
| | Pentaerythritol adipate | — | — | — | — | — | — | — | — |
| Stabilizing aid | Sodium adipate | 0.3 | 0.3 | 0.3 | 0.3 | 0.3 | 0.3 | 0.3 | 0.3 |
| | Magnesium stearate | — | — | — | — | — | — | — | — |
| | Zinc stearate | — | — | — | — | — | — | — | — |
| | Hydrotalcite | — | — | — | — | — | — | — | — |
| | β diketone | — | — | — | — | — | — | 0.5 | — |
| Theremal stability evaluation | Static thermal stability — Coloring initiation time (minutes) | 10 | 10 | 10 | 10 | 10 | 10 | 10 | 10 |
| | Foaming/blackening time (minutes) | 40 | 40 | 20 | 30 | 30 | 20 | 20 | 50 |
| | Dynamic thermal stability — Gelling time (seconds) | 93 | 92 | 74 | 95 | 95 | 73 | 75 | 80 |
| | Decomposition time (minutes) | 10 | 10 | 3 | 5 | 5 | 3 | 3 | 9 |
| Mechanical properties | Tensile strength (MPa) | 54.8 | 61.9 | 45.2 | 54.3 | 55.1 | 45.1 | 44.8 | 51.5 |
| | Tensile modulus (MPa) | 2830 | 2970 | 2610 | 2800 | 2830 | 2590 | 2580 | 2740 |
| | Thermal deformation temperature (° C.) | 108 | 123 | 88 | 107 | 107 | 89 | 89 | 97 |
| Appearance of molded body | Foaming | Absence | Absence | Absence | Presence | Presence | Absence | Absence | Absence |
| | Streaks | Absence | Absence | Absence | Absence | Absence | Absence | Presence | Absence |
| | Scorching | Presence | Presence | Absence | Presence | Presence | Absence | Absence | Absence |

INDUSTRIAL APPLICABILITY

The present invention provides a resin composition for molding containing a chlorinated vinyl chloride-based resin and a molded body thereof.

The invention claimed is:

1. A resin composition for molding, comprising:
a chlorinated vinyl chloride-based resin;
a thermal stabilizer; and
a polyalcohol and/or a partial ester of a polyalcohol,
the chlorinated vinyl chloride-based resin having a chlorine content of 65% by weight or more and less than 72% by weight,
the chlorinated vinyl chloride-based resin having, based on the total number of moles of a structural unit (a) —$CCl_2$—, a structural unit (b) —CHCl—, and a structural unit (c) —$CH_2$—, a proportion of the structural unit (a) of 17.5 mol % or less, a proportion of the structural unit (b) of 46.0 mol % or more, and a proportion of the structural unit (c) of 37.0 mol % or less,
the thermal stabilizer containing at least one of a compound represented by the formula $Ca_{1-x}Mg_x(OH)_2$ where x satisfies the inequality 0<x<1 and a compound represented by the formula $Ca_{1-y}Mg_yO$ where y satisfies the inequality 0<y<1,
the resin composition containing the thermal stabilizer in an amount of 0.4 to 10 parts by weight based on 100 parts by weight of the chlorinated vinyl chloride-based resin,
the chlorinated vinyl chloride-based resin having a UV absorbance at 216 nm of 0.8 or less, measured by recording spectrophotometer at a concentration of 800 ppm, and
a time required for the amount of dehydrochlorination from the chlorinated vinyl chloride-based resin at 190° C. to reach 7000 ppm is 90 seconds or longer.

2. The resin composition for molding according to claim 1,
wherein the chlorinated vinyl chloride-based resin has a chlorine content of 65% by weight or more and less than 69% by weight.

3. The resin composition for molding according to claim 1,
wherein the chlorinated vinyl chloride-based resin has a chlorine content of 69% by weight or more and less than 72% by weight.

4. The resin composition for molding according to claim 1,
wherein the chlorinated vinyl chloride-based resin has, based on the total number of moles of the structural unit (a) —$CCl_2$—, the structural unit (b) —CHCl—, and the structural unit (c) —CH$_2$—, a proportion of the structural unit (b) of 58.0 mol % or more and a proportion of the structural unit (c) of 35.8 mol % or less.

5. The resin composition for molding according to claim 1, wherein the resin composition is free of β-diketone.

6. The resin composition for molding according to claim 1, wherein the resin composition for molding contains the polyalcohol and/or the partial ester of a polyalcohol in a total amount within the range of 0.05 to 3 parts by weight based on 100 parts by weight of the chlorinated vinyl chloride-based resin.

7. The resin composition for molding according to claim 1, further comprising a stabilizing aid.

8. The resin composition for molding according to claim 7, wherein the stabilizing aid comprises at least one of sodium adipate and hydrotalcite.

9. The resin composition for molding according to claim 7, wherein the stabilizing aid comprises an organic acid salt.

10. The resin composition for molding according to claim 7, wherein the stabilizing aid comprises a higher fatty acid salt.

11. A molded body molded from the resin composition for molding according to claim 1.

* * * * *